United States Patent [19]

Chang

[11] Patent Number: 4,458,310

[45] Date of Patent: Jul. 3, 1984

[54] CACHE MEMORY USING A LOWEST PRIORITY REPLACEMENT CIRCUIT

[75] Inventor: Shih-Jeh Chang, Naperville, Ill.

[73] Assignee: AT&T Bell Laboratories, Murray Hill, N.J.

[21] Appl. No.: 307,857

[22] Filed: Oct. 2, 1981

[51] Int. Cl.³ ............................................. G06F 13/00
[52] U.S. Cl. ................................................. 364/200
[58] Field of Search ....... 364/200 MS FILE, 900 MS FILE

[56] References Cited

U.S. PATENT DOCUMENTS

| | | | |
|---|---|---|---|
| 3,588,829 | 6/1971 | Boland et al. | 340/172.5 |
| 3,840,862 | 10/1974 | Ready | 364/200 |
| 3,949,368 | 4/1976 | West | 340/172.5 |
| 4,084,230 | 4/1978 | Matick | 364/200 |
| 4,128,882 | 12/1978 | Dennis | 364/200 |
| 4,322,795 | 3/1982 | Lange et al. | 364/200 |

Primary Examiner—Eddie P. Chan
Assistant Examiner—O. Schatoff
Attorney, Agent, or Firm—P. Visserman

[57] ABSTRACT

A data processing system having a processor, main memory, and a cache memory system which implements the least recently used replacement algorithm in replacing cache memory words with main memory words. The cache memory system is comprised of a cache control circuit and a plurality of cache memories. Each cache memory stores cache memory words having a similar time usage history. The first cache memory stores cache memory words which are more recently used than the cache memory words in the second cache memory, and the second cache memory stores cache memory words which are more recently used than the cache memory words in the third cache memory. When a main memory word must be transferred to the cache memory, the main memory word is stored in the first memory; and the first cache memory's least recently used cache memory word is stored in the second cache memory. The least recently used cache memory word from the second cache memory is stored in the third cache memory. These operations maintain the proper time usage history of the cache memories.

17 Claims, 5 Drawing Figures

FIG. 5

| | M01 | M02 | M03 | M12 | M13 | M23 | SELECTED WORD | LEAST RECENTLY USED WORD |
|---|---|---|---|---|---|---|---|---|
| 501 | 1 | 1 | 1 | 0 | 0 | 0 | | 1 |
| 502 | 1 | 0 | 1 | 0 | 0 | 1 | 2 | 1 |
| 503 | 1 | 0 | 0 | 0 | 0 | 0 | 3 | 1 |
| 504 | 0 | 0 | 0 | 1 | 1 | 0 | 1 | 0 |

CACHE MEMORY USING A LOWEST PRIORITY REPLACEMENT CIRCUIT

TECHNICAL FIELD

My invention relates to computer systems, and, particularly, to a system using a cache memory in which the cache storage location for storing new information is the location of the lowest priority word in the cache memory.

BACKGROUND OF THE INVENTION

Modern computer systems employ processors which are capable of operating at much higher rates of execution than large capacity main memories can support, and a low capacity, high-speed cache memory is commonly used in addition to a large capacity main memory to improve program execution speed. The cache memory stores a limited number of instruction or data words; and for each memory read operation, the cache memory is checked to determine if the information is available in the cache memory. If the information is there, it will be read from the cache memory; otherwise, it will be read from the main memory. If the information must be read from the main memory, the new information must replace existing information in the cache memory at some cache storage location. A satisfactory cache storage location for storing new information is identified by one of the several commonly used replacement algorithms, e.g., random replacement, least recently used, etc. In general, the least recently used replacement algorithm is considered to be the most efficient algorithm; however, implementation of this algorithm in a cost-effective manner without incurring large time delays in maintaining a priority of cache memory locations, with respect to which is the least recently used memory location, has proven difficult to achieve. In particular, it has proven difficult to design a cache memory which was capable of expansion in the field.

SUMMARY OF THE INVENTION

Advantageously, in a computer system in accordance with the present invention, the cache memory system is divided into sections with each section containing cache data words which have a similar priority. Each section has a priority circuit associated with it which maintains the relative priority of the cache data words. Furthermore, the time required to update the cache memory upon receipt of a main memory word which must be inserted into the cache memory is reduced, since the main memory data word is written into one section simultaneous with the transfer of lowest priority cache data words from sections having higher priority cache data words to sections having lower priority cache data words.

In one embodiment of the invention, the data processing system consists of a processor, which requests data words by generating main memory address signals, a main memory and a cache memory system. The cache memory system is comprised of a cache control circuit and a first and a second cache memory. The advantage of configuring the cache memory system into more than one cache memory is that the system is modular and can be expanded in the field. Also, each cache memory can be implemented as one large scale integrated circuit. Each cache memory stores cache data words which are duplicates of words stored in the main memory. Each cache memory also stores the main memory addresses where the associated cache data words are duplicated in main memory. When the processor requests a data word by transmitting main memory address signals, the first and second cache memory compare the stored memory addresses with these memory signals to determine if the requested memory word is stored within either the first or second cache memory. If a cache memory finds a match, it transmits to the cache control circuit a match signal; otherwise, the cache memory transmits a mismatch. If the cache control circuit receives mismatch signals from both cache memories, it generates and transmits the necessary signals to cause two operations to take place. During the first operation, the main memory responds to the main memory address signals to access and transmit the desired main memory word to the processor and to the first cache memory. Also, during this first operation, the first cache memory accesses its lowest priority cache data word with the associated stored main memory address and transmits these to the second cache memory. During the second operation, the first cache memory stores the accessed main memory word and main memory address signals in the previously accessed first cache memory locations and the second cache memory stores the lowest priority cache data word and stored main memory address from the first cache memory in second cache memory locations.

Further, the cache control means is responsive to a mismatch signal from the first cache memory and a match signal from the second cache memory to cause two operations to be performed within the cache memories. During the first operation, the first cache memory accesses and transmits the lowest priority cache data word and the associated main memory address to the second cache memory and the second cache memory transmits the cache data word associated with the matched stored memory address to the first cache memory and to the processor. During the second operation, the first cache memory stores the cache data word and address from the second cache memory in the memory location formerly used by the lowest priority cache data word and memory address. Also, during the second operation, the second cache memory will store the transmitted cache data word and associated address from the first cache memory.

Additionally, each cache memory will be comprised of a match and a data memory. The match memory will be used to store the stored main memory addresses and the data memory will be used to store the cache data words. The match memory will perform a comparison for each set of main memory address signals which the processor sends out and this memory will indicate a match or a mismatch. When a match is found, the match memory transmits an address to the data memory so that it can access and transmit the designated cache data word. A content addressable memory can be used to implement the match memory.

Further, each cache memory has a priority circuit which maintains the priority of each cache data word with respect to when it was accessed within the first cache memory. The priority maintained by the priority circuit is the time usage history of the cache data words. The lowest priority cache data word is the least recently used cache data word.

In a data processing system comprising a processor, main memory and cache memory system having two sections, one illustrative method accesses and updates the cache memory system by storing the cache data words into the cache memory system with the first section containing words which have a higher priority than the words stored in the second section. When the processor accesses a data word, each section is checked to detect whether or not the desired word is contained in that section. If the desired word is not contained in any section, then the main memory will be accessed and the desired word transmitted to the processor and the first section. The accessed main memory word will be used to replace the lowest priority cache data word of the first section and this word will be designated as the highest priority cache data word and the word which had the second lowest priority will be designated as the lowest priority cache data word. The former lowest priority cache data word will be transmitted to the second section where it will replace the lowest priority word of the second section and will become the highest priority word of that section. The word which had the second lowest priority in the second section will then be designated as the lowest priority word.

If the requested word is detected as being in the second section, then the word from the second section will be transmitted to the processor and will be stored in the first section as the highest priority word of the first section. The lowest priority word of the first section will be transferred to the second section where it will become the highest priority word of the second section. The lowest priority word can be the least recently used word, and the highest priority word can be the most recently used word.

BRIEF DESCRIPTION OF THE DRAWING

The invention may be better understood from the following detailed description when read with reference to the drawing in which:

FIG. 5 shows a table giving an example of the operation of the priority circuit of FIG. 3.

DETAILED DESCRIPTION

Figure 1:
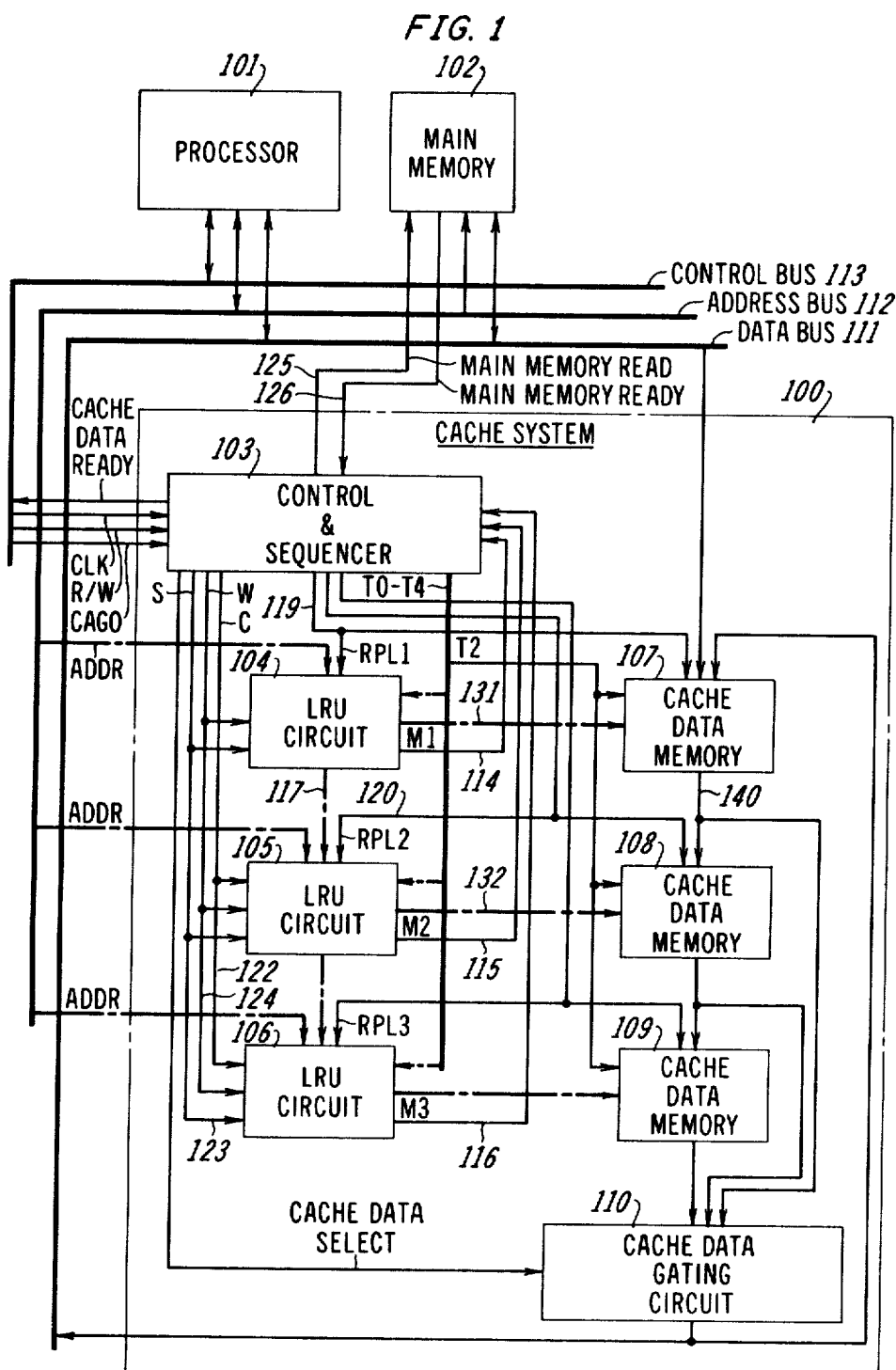
FIG. 1 is a block diagram representation of a data processing system embodying the present invention.

In a data processing system as illustrated in FIG. 1, data and instruction words are stored in memory locations of main memory 102 and cache system 100. Processor 101 reads these memory locations by transmitting an address via address bus 112 and control signals via control bus 113. The cache system 100 is comprised of control sequencer 103, LRU circuits 104, 105 and 106, cache data memories 107, 108 and 109, and cache data gating circuit 110. The LRU circuits and cache data memories are grouped into pairs, and each pair represents a cache memory unit. For example, LRU circuit 104 and cache data memory 107 comprise one cache memory unit.

The cache data words stored in the cache data memories are organized into groups with each group containing cache data words which were last read by processor 101 at a similar point in time. Each group is stored in one of the cache data memories. For example, the most recently used group of words is stored in cache data memory 107, and the least recently used group of words is stored in cache data memory 109. As processor 101 performs read operations, cache data words may have to be transferred between cache data memories to maintain the time usage history of the memories. For example, if it is necessary to read a word from main memory 102, this main memory word will replace the least recently used cache data word of cache data memory 104; and the replaced cache data word will be transferred to cache data memory 108.

During a read operation, the address transmitted by processor 101 is checked by LRU circuits 104, 105, and 106 to determine if the addressed word is contained within cache data memories 107, 108, or 109, respectively.

For example, if LRU circit 104 determines that the addressed word is contained within cache data memory 107, it transmits the address of this word to cache data memory 107 via cable 131. Cache data memory 107 responds to this address by accessing and transmitting the desired word to cache data gating circuit 110. From cache data gating circuit 110, the desired data word is transmitted to processor 101 via data bus 111. If LRU circuit 104 does not match the address being transmitted by processor 101 via address bus 112, it transmits to control sequencer 103 a "1" signal via conductor 114 which indicates a mismatch. The other LRU circuits function in a similar manner.

In addition to checking if the associated cache data memory has the desired memory word, the LRU circuits maintain the priority of each word in the associated cache data memory. This priority information is automatically updated by the LRU circuit for each access to the associated cache data memory and defines which word in the cache memory is the least recently used word.

The system's operation is further illustrated by the three following examples. In the first example, it is assumed that the desired word is not present in the cache system 100 and must be read from main memory 102. If the desired word is not in the cache system 100, then all the LRU circuits will be transmitting "1" signals via the match lines 114, 115 and 116. In response to these signals, control sequencer 103 will access main memory 102 to obtain the desired word. Since the word read from main memory 102 is the most recently used word, it must be placed in cache data memory 107, the least recently used word from cache data memory 107 must be written into cache data memory 108, and the least recently used word of cache data memory 108 must be written into cache data memory 109. The least recently used word of cache data memory 109 no longer exists in cache memory 100 at the completion of the previous operations.

In the second example of the operation of cache system 100, it is assumed that the desired word is in cache data memory 107. Since the desired word is in cache data memory 107, it is not necessary to access a word in main memory 102 or to transfer a memory word from cache data memory 107 to cache data memory 108. Rather, LRU circuit 104 will simply update the priority information stored internally to circuit 104 to properly reflect the usage order of memory words in data memory 107.

In the third example, the desired memory word is assumed to be in data memory 108. In this case, LRU circuit 105 would match the address being transmitted by processor 101 via address bus 112 and cause data memory 108 to access and transmit the desired word to data gating circuit 110. Control sequencer 103 would then cause this desired data word to be transmitted by data gating circuit 110 via data bus 111 to processor 101. Since this desired word is the most recently used word, it must be written into data memory 107. The least recently used word of data memory 107 must be written into the memory location which had previously held the desired memory word in data memory 108.

Figure 2:
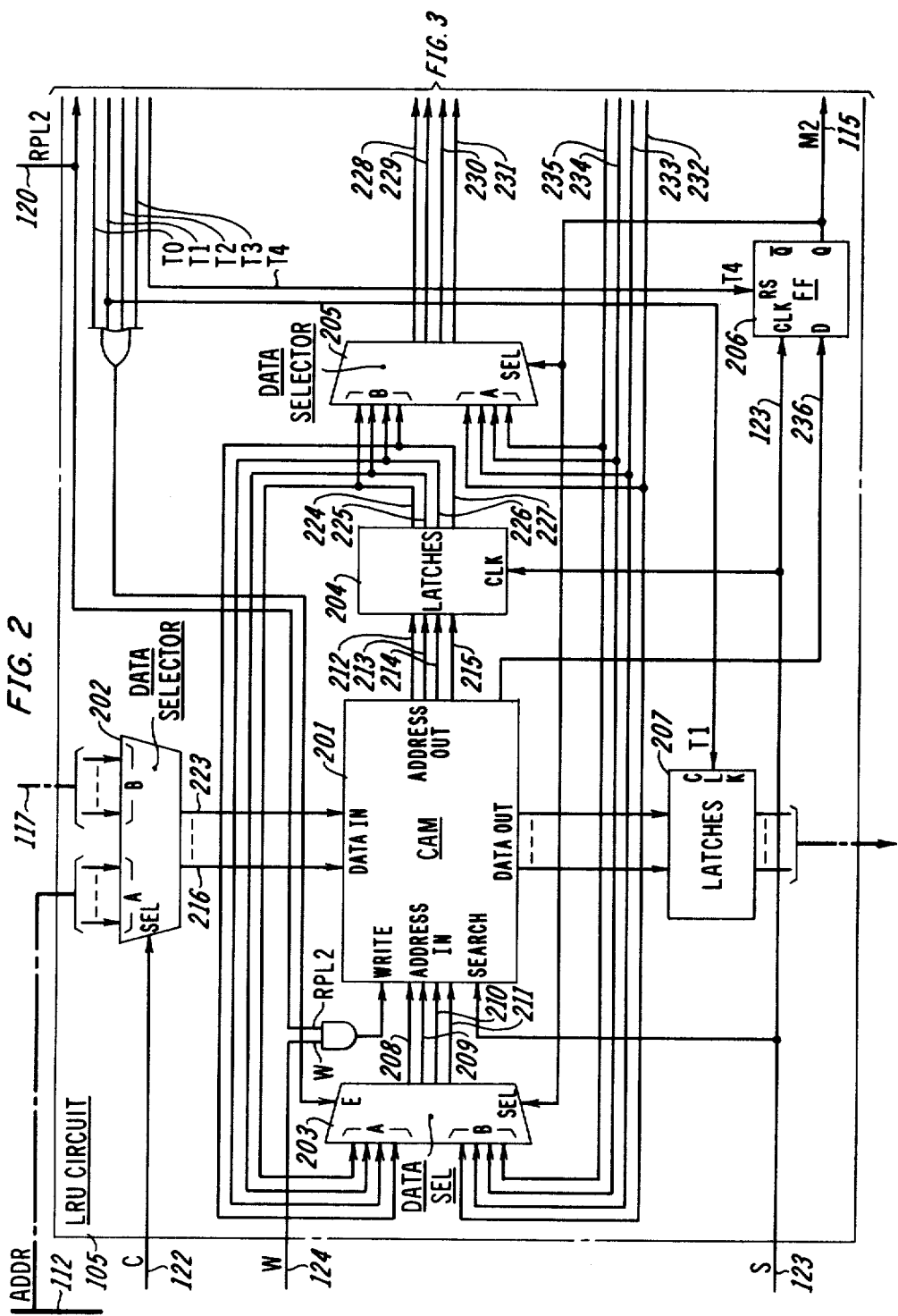
FIGS. 2 and 3 show in greater detail LRU circuit 105 of FIG. 1.
Figure 3:
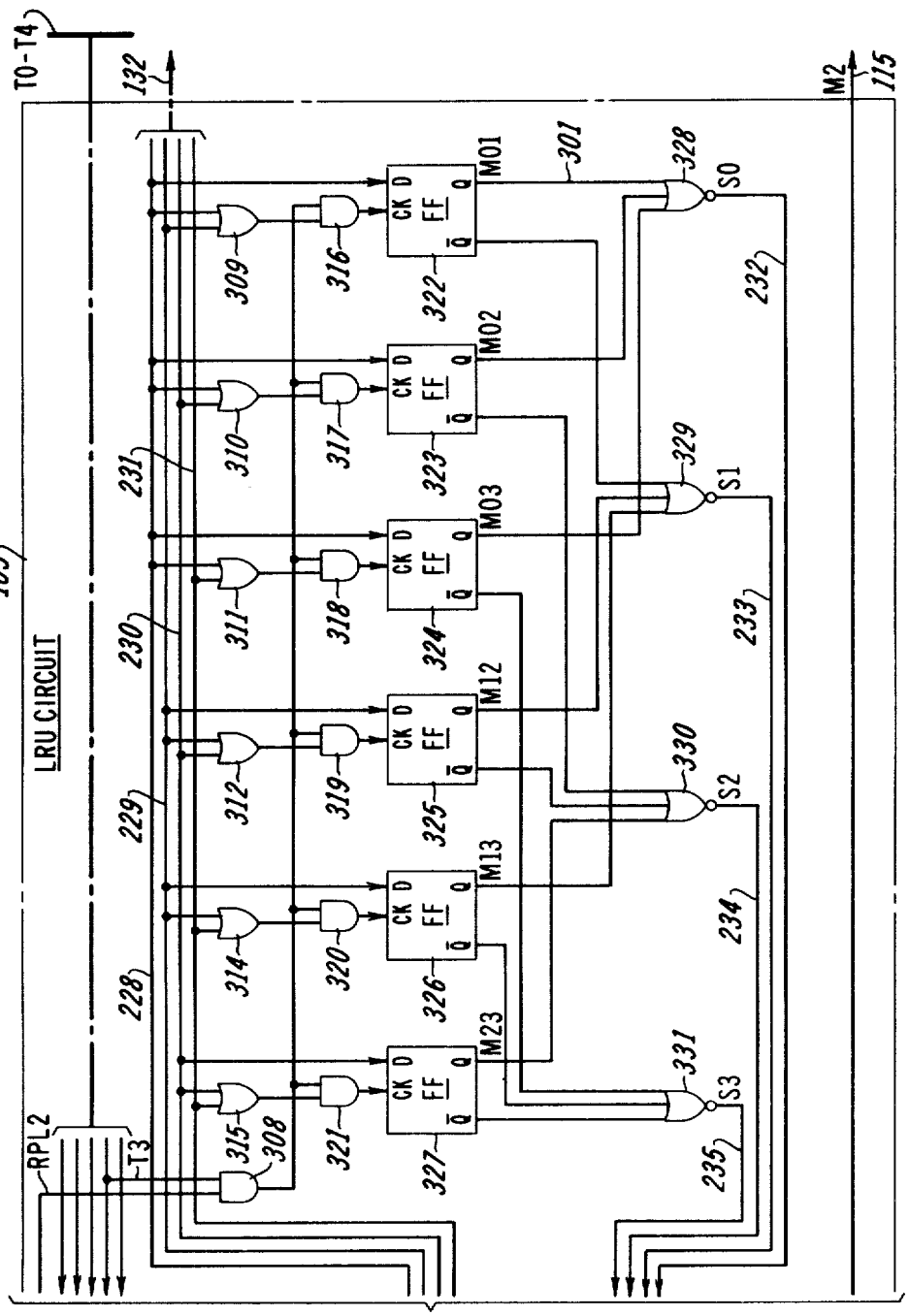
Figure 4:
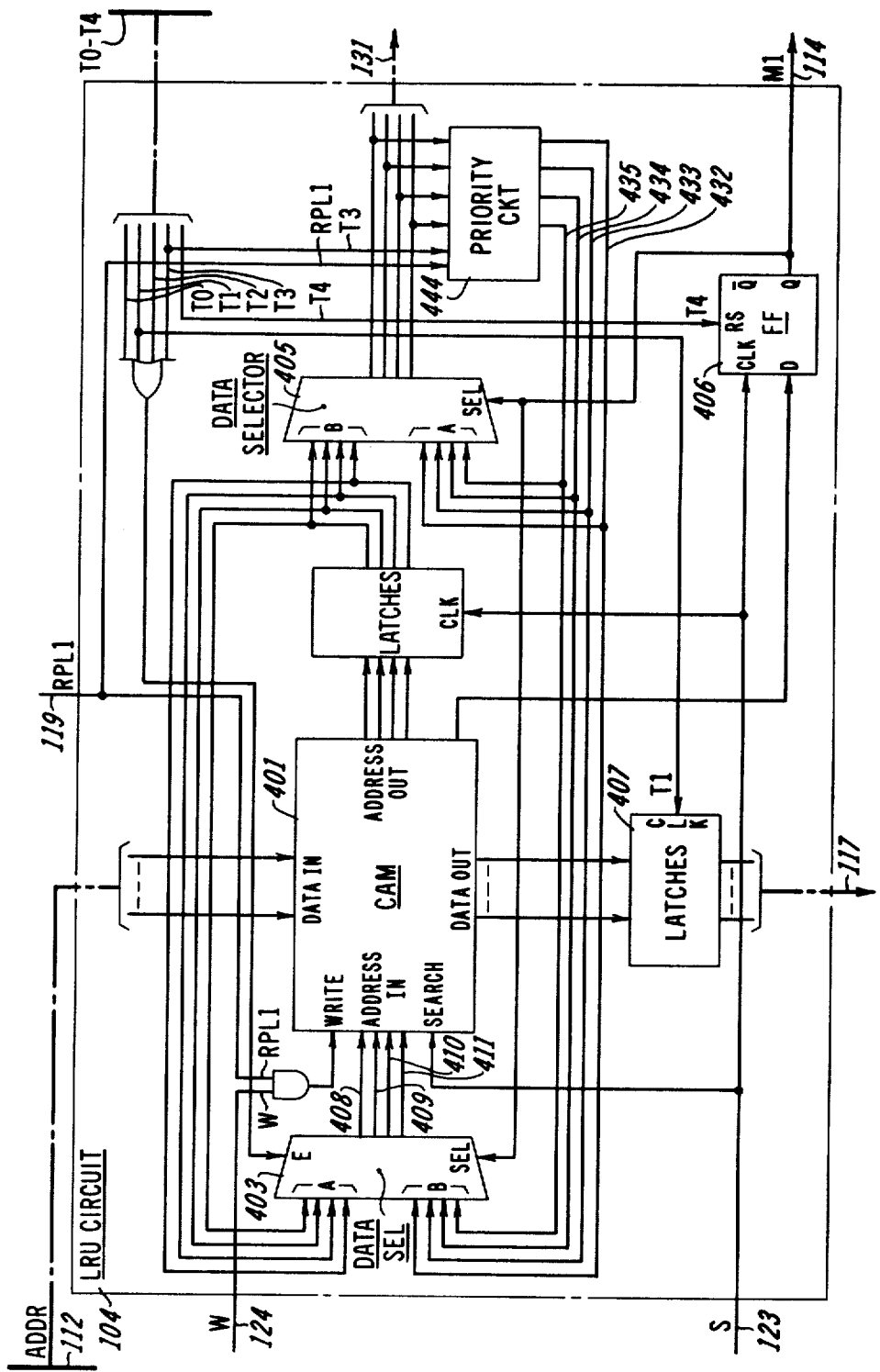
FIG. 4 shows in greater detail the content addressable memory of LRU circuit 104 of FIG. 1.

LRU circuit 105 is illustrated in FIGS. 2 and 3, and LRU circuit 106 is similar in design. LRU circuit 104 is illustrated in FIG. 4. FIG. 2 shows the circuit which is used to check the address transmitted by processor 101 via address bus 112 to determine whether the desired word is in cache data memory 108, and FIG. 3 gives the details of the priority circuit which is used to keep track of the least recently used word in cache data memory 108. When processor 101 reads a word, it first transmits the CAGO signal and the clock signal via control bus 113 to the control sequencer 103 and processor 101 transmits the address via address bus 112. Control sequencer 103 responds to these signals and generates the C signal and S signal which are transmitted via conductors 122 and 123 to the LRU circuits. Data selector 202 responds to the C signal on conductor 122 by selecting the address bits being transmitted via address bus 112 and transmits these address bits via conductors 216 through 223 to the data-in inputs of content addressable memory (CAM) 201. The CAM contains four words, each word having eight bits. The CAM responds to the S input transmitted via conductor 123, and the address bits being received on the data-in inputs to compare these address bits with the contents of each of the four words stored internally. If one of the four words matches the address bits, then a "1" will be transmitted via the associated coductor 212, 213, 214 or 215. If no match is found, then a "1" is transmitted via conductor 236 and stored in flip-flop 206 at T1 time. If a match is found, the state of the conductors 212 through 215 will be stored in latches 204 by the falling edge of the S signal which is transmitted via conductor 123. Data selector 205 will select the contents of latches 204 which are being transmitted via conductors 224 through 227 to be transmitted via conductors 228 through 231 over cable 132 to cache data memory 108. Cache data memory 108 will respond to the address being transmitted via cable 132 by accessing the desired word and transmitting this word to data gating circuit 110, as previously described. Assuming that the desired word was stored in data memory 108, this word now is the most recently used word and must be transferred to data memory 107 and the least recently used word of data memory 107 must be transferred to data memory 108 and the address of this word written into CAM 201.

FIG. 4 shows the circuit which is used to check the address transmitted by processor 10 via address bus 112 to determine whether the desired word is in cache data memory 107, and FIG. 3 gives the details of the priority circuit which is used to keep track of the least recently used word in cache data memory 108. The circuit of FIG. 4 is identical in operation to FIG. 2 with the exception that FIG. 4 does not have a data selector similar to data selector 202 of FIG. 2, and includes priority circuit 444. Priority circuit 444 is identical in design to the priority circuit described with reference to FIG. 3. The reason why no data selector is needed is that the circuit of FIG. 4 always uses the address being transmitted via address bus 112. The circuit of FIG. 4 does not need a data selector because this circuit is associated with the most recently used words in cache memory 100, hence, does not have to decide whether to use the address from address bus 112 or from an LRU circuit having higher priority, as does the circuit shown in FIG. 2. This distinction will be illustrated more clearly in the following example.

To illustrate the operations of the circuits shown in FIG. 2 and FIG. 4, the previously described example 3 is used. Example 3 described the operations which must take place when the desired word is in data memory 108. A more detailed description of this example will now be given by first describing it from the point of view of LRU circuit 105, and then describing the corresponding actions in LRU circuit 104. It is presumed that the word 1 in data memory 108 and word 3 in data memory 107 are the least recently used words. To perform these different operations, the controller sequencer 103 generates a variety of timing signals, the most important of which are T0 through T4. During T0, the address bits on address bus 112 are selected through data selector 202 and used to search CAM 201 for a match. Assuming that these address bits match the contents of word 2 in CAM 201, a "1" will be transmitted on conductor 213; conductors 212, 214, and 215 will be conducting "0s". This operation is done under control of the S signal transmitted via conductor 123 and the C signal transmitted via conductor 122 to data selector 202. The information on conductors 212 through 215 is stored in latches 204 at the end of the S signal. In addition, the S signal also clocks the match output terminal of CAM 201 into flip-flop 206. The output of flip-flop 206 is the M2 signal which is transmitted to control sequencer 103 via conductor 115.

During T1, data selector 203 responds to the M2 signal by selecting the output of latches 204 as an address which is transmitted to CAM 201 via conductors 208 through 211, and data selector 205 responds to the M2 signal by selecting the output of latches 204 as an address which is transmitted to data memory 108 via cable 132. In response to the address on conductors 208 through 211, CAM 201 reads the contents of the second word and transmits these contents to latches 207 in which these contents are stored at the end of T1. Data memory 108 reads the contents of its second word in response to the address transmitted via cable 132. These contents are stored internal to data memory 108 and transmitted to data gating circuit 110. During T1, LRU circuit 104 accesses the address of the least recently used word and transmits this via cable 117 to LRU circuit 105, and data memory 107 accesses the least recently used word and transmits this via cable 140 to data memory 108, as will be described later. The address from LRU circuit 104 must be written into CAM 201 and the corresponding data word written into data memory 108. During T2, data selector 203 will again select the output of latches 204 which contain the address for word 2 to be used as an address for CAM 201. The least recently used address word from LRU circuit 104 will be stored in word 2. During T2, control sequencer 103 will transmit the W signal via conductor 124 and the RPL2 signal via conductor 120 which causes CAM 201 to write the information present at the data input terminals into word 2. At the same time, the least recently used word of data memory 107 is written into word 2 of data memory 108 with the address being supplied by the output of latches 204 via data selector 205 and cable 132. As will be described later, the priority circuit shown in FIG. 3 must be updated during T3 to reflect the fact that word 2 is now the most recently used word in LRU circuit 105. During T4, flip-flop 206 is reset.

Example 3 is now described with respect to LRU circuit 104 with reference to FIG. 4. During T0, a search is performed of CAM 401; however, since no match is found, the match output terminal is a "0" which is stored in flip-flop 406, and no M1 signal is transmitted to control sequencer 103.

During T1, since there is no M1 signal, CAM 401 is addressed by the address from the priority circuit 444 with an address which is transmitted to the ADDRESS IN terminals of CAM 401 via conductors 432 through 435, data selector 403 and conductors 408 through 411. This address bit is the address of the least recently used word of CAM 401 and data memory 107. Also, during T1, data memory 107 is addressed by the outputs of the priority circuit 444 via data selector 405 and cable 131. At the end of T1, the output data of CAM 401 is clocked into latches 407. The contents of latches 407 are transmitted via cable 117 to LRU circuit 105.

During T2 control sequencer 103 transmits the PRL1 and W signals to LRU circuit 104 and data memory 107 via conductors 119 and 124, respectively. In response to these signals, the contents of address bus 112 are written into the location of the least recently used word as determined by the bits on conductors 432 through 435 in CAM 401. At the same time, the word present on data bus 111 is written into data memory 107 at the address transmitted via cable 131.

During T3, the priority circuit 444 must be updated. Note, that during this example, it was not necessary to change any information connected with LRU circuit 106 or data memory 109.

Another previous example to be considered is example 1 where the desired word is not contained within data memories 107 through 109 and must be read from main memory 102. For this example, none of the LRU circuits will find a match during time T0, and at the end of time T0, control sequencer 103 will access main memory 102 to obtain the desired word. Control sequencer 103 accesses main memory 102 by transmitting the main memory read signal via conductor 125. When main memory 102 has accessed the desired word, it responds by transmitting the main memory ready signal via conductor 126 and placing the desired memory word on data bus 111. Control sequencer 103 is responsive to the main memory ready signal to generate the cache data ready signal which informs processor 101 that the data is available on data bus 111 and to execute the following steps to update the LRU circuits and the data memories.

After receipt of the main memory ready signal, the control sequencer 103 transmits the T1 signal. The results of the transmission of the T1 signal are first described with reference to FIG. 2, since no match was found, the M2 signal is not being transmitted via conductor 115, data selector 203 selects the address of the least recently used word which is transmitted via conductors 232 through 235 from the priority circuit of FIG. 3 to perform a read on CAM 201. The word read out of CAM 201 is the address of the least recently used data word which is stored in data memory 108. At the same time, a read is performed on data memory 108 based on the address being transmitted via cable 132, which, again, is the address of the least recently used word. At the end of T1, the address of the least recently used word is clocked into latches 207 and the data being accessed from data memory 108 is similarly clocked into a similar set of latches in data memory 108. The same type of operation is being performed in LRU circuits 104 and 106 and data memory 107 and data memory 109.

During T2, the addresses being transmitted via cable 117 from LRU circuit 104 is written into CAM 201 at the address of the least recently used word as defined by the address transmitted via conductors 232 through 235 from the priority circuit of FIG. 3. Similarly, the data which had been accessed from data memory 107 is written into data memory 108.

With respect to LRU circuit 104, the address on address bus 112 is written into the location in CAM 401 which is addressed by information transmitted via conductors 432 through 435 from priority circuit 444 which designates the least recently used word address. The data which is present on data bus 111 is written into the least recently used word of data memory 107 at the address of the least recently used word. Similar operations take place in LRU circuit 106 and data memory 109. During T3, the priority circuits of LRU circuits 104, 105, and 106 must be updated to reflect the fact that the previously least recently used words are now the most recently used words.

To illustrate the operation of the priority circuit shown in FIG. 3, reference is made to example 3 which described the operations when the desired word is contained in data memory 108. The operation of the priority circuit of FIG. 3 is similar in operation to priority circuit 444 of FIG. 4 and the priority circuit of LRU circuit 106. In the previous example, the least recently used word was word 1 in data memory 108 and the corresponding address in CAM location 1 of LRU circuit 105. During the match operation which took place during time T0, word 2 of CAM 201 was found to contain the address which processor 101 was attempting to read. During time T3, the priority circuit shown in FIG. 5 must be updated to reflect the fact that word 2 is now the most recently used word. However, word 1 still remains the least recently used word. Flip-flops 322 through 327 are used to maintain the priority of the words contained in CAM 201 and data memory 108 with respect to the usage order. NOR gates 328 through 331 decode the information contained in flip-flops 322 through 327 so as to indicate which word is the least recently used word. For example, if NOR gate 328 is transmitting a "1" via conductor 232, this indicates that word 0 is the least recently used word. OR gates 309 through 315 and AND gates 316 through 321 are used to determine which flip-flops 322 through 327 should be modified during an update operation on the priority circuit. Table 1 defines the significance of one of these flip-flops being set. For example, if flip-flop 322 is set, then flip-flop 322 will transmit the M01 signal as a "1" to NOR gate 328 via conductor 301. The significance of the flip-flop 322 being set is that word 0 has been used more recently than word 1.

TABLE I

| Flip-flop Set | Signal Transmitted by Flip-flop | Defines | | |
|---|---|---|---|---|
| | | Word used more recently | than | Word |
| 322 | M01 | 0 | | 1 |
| 323 | M02 | 0 | | 2 |
| 324 | M03 | 0 | | 3 |
| 325 | M12 | 1 | | 2 |
| 326 | M13 | 1 | | 3 |

TABLE I-continued

| Flip-flop Set | Signal Transmitted by Flip-flop | Defines | | |
|---|---|---|---|---|
| | | Word used more recently | than | Word |
| 327 | M23 | 2 | | 3 |

The functions performed by NOR gates 328 through 331 are defined by Table 2.

TABLE 2

$$S0 = \overline{M01} \cdot \overline{M02} \cdot \overline{M03}$$
$$S1 = M01 \cdot \overline{M12} \cdot \overline{M13}$$
$$S2 = M02 \cdot M12 \cdot \overline{M23}$$
$$S3 = M03 \cdot M13 \cdot M23$$

By convention, if a "1" is transmitted via conductor 232, this is defined to mean that the S0 signal is being transmitted. If flip-flop 322 is set, then the value in Table 2 for M01 is a "1", and the value for $\overline{M01}$ is a "0"; and if flip-flop 322 is reset, then the value for M01 is a "0" and the value for $\overline{M01}$ is a "1". For example, if flip-flops 322, 323 and 324 are reset, then the S0 signal is transmitted via conductor 232.

The operations of OR gates 309 through 315 and AND gates 316 through 321 at update time is defined by Table 3.

TABLE 3

| "1" transmitted via conductor at update time | Flip-flops which are set | Flip-flops which are reset |
|---|---|---|
| 228 | 322, 323, 324 | |
| 229 | 325, 326 | 322 |
| 230 | 327 | 323, 325 |
| 231 | | 324, 326, 327 |

Update time occurs at time T3 when the RPL2 signal is being transmitted via conductor 120 from control sequencer 103. T3 and RPL2 and ANDed together by AND gate 308 which enables the OR gates 309 through 315 and AND gates 316 through 321. For example, if a "1" is being transmitted via conductor 231 during the update time, then flip-flops 324, 326 and 327 will be reset. A "1" being transmitted via conductor 231 indicates that word 3 is now the most recently used word, hence, by Table 1, flip-flops 324, 326 and 327 cannot be set because they indicate that word 0, word 1 and word 2, respectively, have been more recently accessed than word 3.

To more clearly illustrate the operations of the circuit shown on FIG. 3, the previous example of word 2 being matched during the operation at time T0 will now be described with respect to FIG. 5. Line 501 shows the initial state of the flip-flops 322 through 327. When word 2 is determined to contain the desired word, the contents of word 2 are accessed in both CAM 201 and data memory 108 and transmitted and stored within LRU circuit 104 and data memory 107. The least recently used words from LRU circuit 104 and data memory 107 are transmitted to LRU circuit 105 and data memory 108 and are stored in word 2 of each of these memories. After this information has been stored in word 2, then word 2 is the most recently used word and flip-flops 322 through 327 must be updated accordingly. Since word 2 was the selected word, data selector 205 of FIG. 2 is transmitting a "1" via conductor 230. OR gates 309 through 315 and AND gates 316 through 321 respond to the "1" being transmitted via conductor 230 to set flip-flops 327 and reset flip-flops 323 and 325. This is shown on line 502 of FIG. 5. Note, that the least recently used word is still word 1 in line 502. If, in the next search operation, the desired word is word 3, the flip-flops 322 through 327 will be updated during time T3 to reflect the states shown in line 503. If, on the next search operation, word 1 is found to contain the desired information, then the flip-flops 322 through 327 will be updated to reflect the state shown in line 504. Note, that the least recently used word is now word 0 which has not been accessed in the last three operations during which words 2, 3 and 1 were both accessed.

It is to be understood that the above-described embodiment is merely illustrative of the principles of the invention and that other arrangements may be devised by those skilled in the art without departing from the spirit and scope of the invention.

What is claimed is:

1. A data processing system comprising:

a processor means for generating main memory address signals;

a main memory having a plurality of memory locations for storing main memory words;

a cache control means;

first and second cache memories each having a plurality of memory locations for storing main memory addresses and corresponding cache data words in a priority order, and each responsive to main memory address signals which mismatch all of the main memory addresses stored therein to generate and transmit a mismatch signal to said cache control means;

said cache control means responsive to concurrent generation of said mismatch signals by said first and second cache memories to generate and transmit a first control signal to said main memory and said first and second cache memories;

said main memory responsive to said first control signal and said mismatched main memory address signals to access and transmit a main memory word to said first cache memory;

said first cache memory responsive to said first control signal to transmit the lowest priority cache data word and its corresponding stored main memory address to said second cache memory, and to store said transmitted main memory word and said main memory address signals; and said second cache memory responsive to said first control signal to store the transmitted lowest priority cache data word and its corresponding main memory address.

2. A data processing system in accordance with claim 1 wherein said second cache memory is further responsive to main memory address signals which match a main memory address stored therein to generate and transmit a match signal to said cache control means;

said cache control means is further responsive to a mismatch signal from said first cache memory and said match signal from said second cache memory to generate and transmit a second control signal to said first and second cache memories;

said first cache memory responsive to said second control signal to transmit the lowest priority cache data word and its corresponding stored main memory address to said second cache memory; and said second cache memory responsive to said second control signal to store said lowest priority cache data word and said corresponding stored main memory address transmitted in response to said second control signal from said first cache memory in the cache memory locations associated with the stored main memory address which matched said main memory address signals.

3. A data processing system in accordance with claim 2 wherein said second cache memory is further responsive to said second control signal to transmit said matched main memory address and its corresponding cache data word to said first cache memory; and
said first cache memory further comprises means responsive to said second control signal to store said matched stored main memory address and said corresponding cache data word in the cache memory locations of said transmitted corresponding main memory address and said transmitted lowest priority cache data word of said first cache memory, respectively.

4. A data processing system in accordance with claim 1 wherein said first cache memory is further responsive to said first control signal to store said main memory word and said mismatched main memory address signals in the cache memory locations of said transmitted lowest priority cache data word and said transmitted corresponding stored main memory address in said first cache memory.

5. A data processing system in accordance with claim 1 wherein said second cache memory is further responsive to said first control signal to store said transmitted lowest priority cache data word and said transmitted corresponding stored main memory address from said first cache memory in the cache memory locations of the lowest priority cache data word and corresponding stored main memory address of said second cache memory, respectively.

6. A data processing system in accordance with claim 2 wherein said second cache memory further comprises a match memory having a plurality of memory locations for storing said stored main addresses and a data memory having a plurality of memory locations for storing said cache data words;
said match memory is responsive to said matched main memory address signals to transmit said match signal and to generate and transmit a cache memory address of the memory location whose contents matched said matched main memory address signals to said data memory, and responsive to said mismatched main memory address signals to generate and transmit said mismatch signal; and
said data memory is responsive to said cache memory address to access and transmit said corresponding cache data word.

7. A data processing system in accordance with claim 6 wherein said match memory is comprised of a content addressable memory.

8. A data processing system in accordance with claim 6 wherein each of said first and second cache memories further comprises a priority means for determining the least recently used cache data word which is the lowest priority cache data word.

9. A data processing system in accordance with claim 8 wherein each of said priority means is further adapted for generating the address of the least recently used data word.

10. A data processing system in accordance with claim 9 wherein said priority means of said first cache memory further comprises a storage means and a logic means; and
said logic means responsive to contents of said storage means and said cache memory address to generate and store information defining the accessed order of said cache data words of said first cache memory in said storage means.

11. In a data processing system having a processor for generating main memory address signals, a main memory for storing main memory words, first and second cache memories for storing main memory addresses and corresponding cache data words and for matching a stored main memory address word with the main memory address signals, and a cache control for controlling said first and second cache memories, a method of accessing said cache memories and said main memory;
comprising the steps of:
storing a set of said cache data words and corresponding main memory address words having a higher priority than another set of said cache data words and corresponding main memory address words in said first cache memory;
storing said other set of said cache data words and corresponding main memory address words in said second cache memory;
detecting main memory address signals which mismatch all of main memory address words stored in said first and second cache memories;
reading from said main memory, the main memory word addressed by the mismatched main memory address signals;
transferring said main memory word to said processor and said first cache memory;
storing said main memory word and said mismatched main memory address signals in said first cache memory;
transmitting the lowest priority cache data word of said first cache memory to said second cache memory;
replacing said lowest priority cache data word of said first cache memory with said main memory data word;
identifying within said first cache memory said main memory data word as the highest priority cache data word and another cache data word as the lowest priority cache data word; and
storing said transmitted cache data word from said first cache memory in said second cache memory.

12. The invention of claim 11 wherein said transmitting step comprises the steps of:
replacing the lowest priority cache data word of said second cache memory with said transmitted cache data word; and
identifying within said second cache memory said transmitted cache data word as the highest priority and another cache data word as the lowest priority cache data word.

13. In a data processing system having a processor for generating main memory address signals, a main memory for storing main memory words, first and second cache memories for storing main memory addresses and corresponding cache data words and for matching the stored main memory addresses with the main memory address signals, and a cache control for controlling said first and second cache memories, a method of accessing said cache memories and said main memory;
comprising the steps of:

storing a set of said cache data words and corresponding main memory addresses having a higher priority than another set of said cache data words and corresponding main memory addresses in said first cache memory;

storing said other set of said cache data words and corresponding main memory words in said second cache memory;

detecting main memory address signals which match one of the stored main memory addresses in said second cache memory;

transferring the cache data word corresponding to the matched one of said stored main memory addresses from said second cache memory to said processor and said first cache memory; and storing said transferred cache data word from said second cache memory in said first cache memory.

14. The invention of claim 13 wherein said storing of said transferred cache data word step comprises the steps of:

transmitting the lowest priority cache data word of said first cache memory to said second cache memory;

replacing said lowest priority cache data word of said first cache memory with said transferred cache data word from said second cache memory; and identifying within said first cache memory said transferred cache data word from said second cache memory as the highest priority cache data word and another cache data word as the lowest priority cache data word.

15. The invention of claim 14 wherein said transmitting step comprises the steps of:

replacing the lowest priority cache data word of said second cache memory with said transmitted cache data word from said first cache memory; and identifying within said second cache memory said transmitted cache data word from said first cache memory as the highest priority cache data word and another cache data word as the lowest priority cache data word.

16. The invention of claims 11 or 14 wherein said lowest priority cache data word of said first cache memory comprises a least recently used cache data word of said first cache memory and said transmitting step comprises the step of transmitting said least recently used cache data word of said first cache memory; and said replacing step comprises the step of replacing said least recently used cache data word of said first cache memory.

17. The invention of claim 14 wherein said highest priority cache data word from said cache memory comprises a most recently used cache data word and said step of transferring comprises the step of transferring said most recently used cache data word; and said step of replacing comprises the step of replacing with said most recently used cache data word.

* * * * *